Patented Sept. 17, 1940

2,215,145

UNITED STATES PATENT OFFICE 2,215,145

PROCESS OF LACQUERING METAL ARTICLES

William Clayton and Harry Kenneth Dean, London, England, assignors to Crosse and Blackwell Limited, London, England, a corporation of Great Britain No Drawing. Application June 4, 1938, Serial No. 211,814. In Great Britain June 4, 1937

4 Claims. (Cl. 204—1)

This invention relates to the coating of metal surfaces.

The chief object of the present invention is to provide a method of coating metal surfaces with compositions which are cheaper than those hitherto employed to give similar results.

Further objects will appear hereafter.

Protection of metal surfaces from attack by their environment is frequently achieved by application of a thin adherent film consisting of or containing organic material which itself is substantially unaffected by the said environment. The composition of the organic material will be governed by the nature of the attack which must be withstood; for example, pigmented drying oil compositions have been found to be suitable for exposure to normal atmospheric conditions, but where the coating is subjected to high temperatures, particularly in presence of moisture, or to abrasion, it is usual to employ drying oil compositions which contain considerable proportions of natural or synthetic resins or bitumen. In some cases synthetic resins alone have been used. The hardness and water resistance of the coating have been increased also by a thermo-hardening process (stoving at an elevated temperature) as an alternative to air-drying.

In the case of containers used for preserving certain foodstuffs, where it is necessary to prevent the foodstuff from coming into contact with the metal surface, the coating must be resistant to the foodstuff during pasteurisation or sterilisation at elevated temperatures, as well as on storage at ordinary temperature. Furthermore, if the lacquer is applied mechanically, for example by rolling, to flat metal sheets prior to fabrication of the containers, the tooling operations during fabrication impose a severe strain on the coating. For these reasons synthetic resin lacquers or bituminous lacquers have generally been employed heretofore.

When coatings are applied by any of the foregoing methods, it is found that as the ratio of resin or bitumen to drying oil in the composition is decreased, it becomes increasingly difficult to find stoving conditions (time and temperature) which will yield a coating of satisfactory properties in the above respects. For example, a typical lacquer made with a resin/oil ratio of 1:1.75 gives a coating suitable for contact with peas, using a film weight of 4 milligrams per square inch, and stoving for 30 minutes at 385° F. Under the same conditions a ratio of 1:3 is usually unsatisfactory from the point of view of hardness and resistance to attack by the packed commodity at elevated temperatures, for example the temperature at which the commodity is normally sterilised. Further reduction of the resin/oil ratio eventually leads to a composition which is unsatisfactory in the above respects even after prolonged stoving. Thus a composition of ratio 1:7 is quite unsuitable for contact with peas. The actual figures quoted are subject to some variation according to the oil and resin used, as well as to the foodstuff in question.

We have now found that compositions, wherein the resin/oil or bitumen/oil ratio makes it impossible to obtain satisfactory coatings when applied by the normal methods of rolling, spraying or brushing may be utilised successfully if such a composition is dispersed in an aqueous medium and electrodeposited from the resulting emulsion directly on the metal surface functioning as one electrode. Furthermore, it is possible to obtain satisfactory coatings from compositions which contain no resin or bitumen at all. The films thus produced are, after drying and stoving, harder and chemically more resistant than films of the same composition applied by mechanical methods and subjected to the same stoving conditions.

According to the invention, therefore, a process of coating metal surfaces consists in electrodepositing the coating from an aqueous dispersion of a drying oil or from an aqueous dispersion of a drying oil to which has been added an amount of bitumen or natural or synthetic resin which is less than that necessary for producing a hard water resistant coating by mechanical application followed by stoving, and then drying and stoving the deposited coating.

According to the invention it is possible to obtain good results with 1 part of resin or bitumen to 3 to 5 parts of oil, but coatings of satisfactory results can also be obtained with 1 part of resin or bitumen to 7 to 10 parts of oil. Compositions containing less than 1 part of resin or bitumen to twenty parts of oil may be described as substantially free from resin or bitumen, and as shown by the examples, good results can be obtained with resin-free emulsions.

The invention is not limited to any particular drying oils, or mixture of oils, or any particular dispersion medium. The choice of the oil phase will be determined by the nature of the product which is to be packed in the container and the degree of protection required.

The low mechanical strength and water resistance of a film of conventionally applied drying oil appears to be due to the low ratio of cross linkages to chain length. By increasing this ratio therefore, the mechanical strength and water resistance of the applied coating may be increased. This is attained by the use of heavily blown or heavily polymerised oils, e. g., by the use of heavy blown stand oils or by the polymerisation of heavily blown oils prepared from linseed or fish oils, or by the use of oiticica or tung oils.

The adhesion to metal is dependent upon the presence of metalophilic groups in the lacquer and it is found that blown oils possess marked superiority in this respect.

A suitable drying oil may be obtained by utilising a combination of tung, oiticica and dehydrated castor oil with blown-plymerized linseed and fish oils.

As additions small amounts of alkyl phenols may be made to oiticica oil with a view to increasing the extent of polymerization. Waxes such as chlorinated naphthalenes improve the water resistance and aluminium stearate improves water resistance and adhesion.

The choice of the dispersion medium and the emulsifying agent employed will depend on the properties of the oil phase. For example, if a high proportion of linseed oil is present then the free acidity of the oil will be high and good emulsions are prepared in a medium containing 1% ammonia but where the oil mixture has a low free acidity, as may be the case when tung oil is a major constituent, then it may be an advantage to add an additional emulsifying agent, e. g., ammonium oleate, in sufficient concentration to give a stable emulsion.

An alkaline or neutral dispersion medium is preferably employed and the metallic surface is then made the anode for electrodeposition of the coating. By this means electrode-position of the coating also produces anodic oxidation of the metal surface as described in British patent specification No. 455,810.

If co-deposition of alumina with the oil is required, then the lacquer may be emulsified in, and deposited from, sodium aluminate solution as described in the specification of co-pending application No. 198,682 and as referred to in Example 3 below.

In order to illustrate the invention the following examples are given of emulsions according to the invention for coating metal containers intended for the canning of foodstuffs. The process is not limited to the oils mentioned but any drying oil mixture which, on drying and stoving subsequent to application, yields a film suitable for contact with foodstuffs, may be employed.

*Example 1*

A mixture of 200 lbs. of castor oil and 200 lbs. of oiticica oil is brought to 120° C. in 1 hour and held at this temperature for 2 hours, while a slow stream of air is passed through it. The temperature is then raised to 270° C. in about 1 hour and held at this temperature for a further 2-3 hours, the stream of air being continued the whole time. The mixture is then cooled to 100° C. and emulsified in 60 gallons of softened water at 50° C. containing 1% ammonia.

Cans are then coated by electrodeposition of the disperse phase from this emulsion and stoved until sufficiently hard.

If desired, 40 lbs. of one of the usual synthetic resins (as employed in the lacquer industry) may be dispersed in the heated oil, and the quantity of water increased to 66 gallons. A smaller amount of stoving can then be applied to give a film of the desired hardness.

*Example 2*

400 lbs. oiticica oil is heated at 100-150° C. with 8 lbs. p-cresol or 2:6 dimethylol-p-cresol for 1 hour and the temperature raised rapidly to 280° C. and then checked by ice or cold water.

The mixture is then emulsified and the cans are then coated by electrodeposition from the emulsion as described in Example 1.

*Example 3*

1 part of tung oil and 3 parts of linseed oil are heated to 200° C. and blown with air in the presence of 2% aluminium chloride or 2% silicon chloride for 3 hours. The temperature is then raised to 280° C. at which it is held for a further 2 hours. The oil is cooled to about 120° C., filtered or clarified, and then emulsified in, for example, 6 parts of 1% ammonia or 1% sodium aluminate.

*Example 4*

400 lbs. of tung oil are heated in 20-30 minutes to 285° C. The source of heat is removed and the temperature allowed to rise to 290° C. when it is checked by addition of 40 lbs. of cold linseed stand oil. The oil is then cooled quickly to below 250° C. and emulsified as described in Example 1.

In all the above examples 2% of a mixed cobalt-manganese naphthenate drier (Co:Mn= 1.5:10) was added prior to emulsification.

Thinners (such as turpentine or spirit) need not normally be added to the oils but when the oil is very viscous thinner may be added to facilitate emulsification.

The process according to the invention is applicable to metal surfaces generally and tinned iron, black plate or aluminium may be coated according to the invention.

Electrodeposition markedly reduces porosity of the film, and when applied to the fabricated can it makes mechanical strength less important since the film need not resist the can making operation. Thus open top cans or tubular can bodies may be coated by the process according to the invention and can ends may also be coated according to the invention for application to the tubular bodies and to the open top can after it has been filled with the commodity.

The invention is not limited to the coating of the built up cans, however, and flat sheets of tinplate may be coated according to the invention, and the cans manufactured from the coated sheets.

By means of the present invention it is possible to obtain a satisfactory coating by using lacquers which are cheaper than those which have heretofore been employed.

We declare that what we claim is:

1. A method of lacquering metal articles for foodstuff containers with drying oil compositions which comprises subjecting a metal article as anode to electrodeposition of a drying oil coating from an aqueous dispersion of a drying oil and resin, the ratio of oil to resin being greater than 3:1, drying the coated article and stoving to form a coating of hardness and resistance to the foodstuff during pasteurization or sterilization at elevated temperatures.

2. The process as set forth in claim 1, in which the aqueous dispersion contains a large proportion of oxidized linseed oil.

3. The process as set forth in claim 1, in which the aqueous dispersion contains a substantial proportion of polymerized tung oil.

4. A metal article for foodstuff containers, said article carrying a coating of a drying oil and resin composition, the ratio of oil to resin being greater than 3:1, having the hardness and resistance to the foodstuff during pasteurization or sterilization at elevated temperatures resulting from anodic electrodeposition of said coating from an aqueous dispersion of a drying oil and resin in the above given ratio.

WILLIAM CLAYTON.
HARRY KENNETH DEAN.